United States Patent
Fingscheidt et al.

(10) Patent No.: US 7,630,878 B2
(45) Date of Patent: Dec. 8, 2009

(54) SPEECH RECOGNITION WITH LANGUAGE-DEPENDENT MODEL VECTORS

(75) Inventors: Tim Fingscheidt, München (DE); Sorel Stan, Starnberg (DE)

(73) Assignee: SVOX AG, Zurich (CH)

( * ) Notice: Subject to any disclaimer, the term of this patent is extended or adjusted under 35 U.S.C. 154(b) by 122 days.

(21) Appl. No.: 10/566,293

(22) PCT Filed: May 4, 2004

(86) PCT No.: PCT/EP2004/050687

§ 371 (c)(1),
(2), (4) Date: Jan. 27, 2006

(87) PCT Pub. No.: WO2005/013261

PCT Pub. Date: Feb. 10, 2005

(65) Prior Publication Data

US 2007/0112568 A1    May 17, 2007

(30) Foreign Application Priority Data

Jul. 28, 2003    (DE) ................ 10334400.4

(51) Int. Cl.
*G10L 15/06* (2006.01)
*G06F 17/28* (2006.01)
(52) U.S. Cl. ............... 704/8; 704/243; 704/255
(58) Field of Classification Search .......... 704/8, 704/231, 233, 243, 255, 256, 277; 379/88.06
See application file for complete search history.

(56) References Cited

U.S. PATENT DOCUMENTS

| | | | | |
|---|---|---|---|---|
| 5,412,716 A | * | 5/1995 | Blaha | 379/338 |
| 5,623,609 A | * | 4/1997 | Kaye et al. | 704/1 |
| 6,006,221 A | * | 12/1999 | Liddy et al. | 707/5 |
| 6,085,160 A | * | 7/2000 | D'hoore et al. | 704/256.2 |

(Continued)

FOREIGN PATENT DOCUMENTS

DE    41 08 785 A1    10/1991

(Continued)

OTHER PUBLICATIONS

D. L. Vos et al.; "Algorithm and DSP-Implementation for a Speaker-Independent Single-Word Speech Recognizer with Additional Speaker-Dependent Say-In Facility"; Proceedings IEEE Workshop on Interactive Voice Technology for Telecom Applications, Sep. 1996; pp. 53-56.

(Continued)

*Primary Examiner*—Martin Lerner
(74) *Attorney, Agent, or Firm*—Staas & Halsey LLP

(57) ABSTRACT

Speaker-dependent speech recognition is performed upon detecting a speech signal encompassing a voice command. The speech signal is divided into time frames and characterized in each detected time frame by forming a corresponding property vector. A language-independent feature vector sequence is formed from one or several property vectors and then stored. The language-independent feature vector sequence is allocated to a language-dependent sequence of model vectors in a speech resource having a plurality of model vectors. A piece of allocation information indicating allocation of the language-independent feature vector sequence to a language-dependent sequence of model vectors is stored, then the voice command allocated to the model vector sequence is identified.

12 Claims, 4 Drawing Sheets

U.S. PATENT DOCUMENTS

| | | | |
|---|---|---|---|
| 6,212,500 B1 * | 4/2001 | Kohler | 704/256 |
| 6,253,181 B1 * | 6/2001 | Junqua | 704/255 |
| 6,389,393 B1 * | 5/2002 | Gong | 704/244 |
| 6,460,017 B1 * | 10/2002 | Bub et al. | 704/256 |
| RE38,101 E | 4/2003 | Vysotsky et al. | |
| 6,658,385 B1 * | 12/2003 | Gong et al. | 704/244 |
| 6,912,499 B1 * | 6/2005 | Sabourin et al. | 704/243 |
| 7,043,431 B2 * | 5/2006 | Riis et al. | 704/259 |
| 7,065,487 B2 * | 6/2006 | Miyazawa | 704/233 |
| 7,072,834 B2 * | 7/2006 | Zhou | 704/244 |
| 7,149,688 B2 * | 12/2006 | Schalkwyk | 704/255 |
| 7,165,027 B2 * | 1/2007 | Kellner et al. | 704/233 |
| 7,496,498 B2 * | 2/2009 | Chu et al. | 704/4 |
| 2002/0040296 A1 * | 4/2002 | Kienappel | 704/220 |
| 2004/0078191 A1 * | 4/2004 | Tian et al. | 704/9 |
| 2004/0088163 A1 * | 5/2004 | Schalkwyk | 704/251 |
| 2005/0021335 A1 * | 1/2005 | Chaudhari et al. | 704/243 |

FOREIGN PATENT DOCUMENTS

| | | |
|---|---|---|
| DE | 195 33 541 C1 | 3/1997 |
| DE | 196 24 988 A1 | 1/1998 |
| DE | 196 35 754 A1 | 3/1998 |
| EP | 0 797 185 A2 | 9/1997 |
| EP | 1 220 196 A1 | 7/2002 |
| GB | 2 242 148 A | 9/1991 |
| WO | 02/05263 A1 | 1/2002 |
| WO | 02/21513 A1 | 3/2002 |

OTHER PUBLICATIONS

German Search Report for Application No. 103 34 400.4, dated Mar. 19, 2004.

International Search Report for European Application No. PCT/EP2004/050687; mailed Oct. 14, 2004.

* cited by examiner

SPEECH RECOGNITION WITH LANGUAGE-DEPENDENT MODEL VECTORS

CROSS REFERENCE TO RELATED APPLICATIONS

This application is based on and hereby claims priority to German Application No. 103 34 400.4 filed on Jul. 28, 2003, the contents of which are hereby incorporated by reference.

BACKGROUND OF THE INVENTION

1. Field of the Invention

The invention relates to a method for speech recognition and a communication device, in particular a mobile telephone or a portable computer having a speech recognition entity.

2. Description of the Related Art

Communication devices such as e.g. mobile telephones or portable computers have undergone progressive miniaturization during recent years, in order to facilitate their use when travelling. As well as greater portability, this progressive miniaturization also poses significant problems with regard to ease of use. As a result of the housing surface being smaller in comparison with earlier communication devices, the housing surface can no longer be equipped with a number of keys that corresponds to the functionality of the devices.

Since increasing the multiple assignment of keys is also incompatible with ease of operation, communication devices of greater complexity offer facilities for speech control. This requires speech recognition facilities in the communication device.

Many communication devices therefore offer speaker-independent speech control. In the context of speech control, the user enters command words such as "dial", "phone book", "emergency", "reject" or "accept" in a manner which is similar to the customary speed dialing. The telephone application which is associated with these command words can be used directly in the corresponding manner by a user, without the user personally having to train the system for this purpose beforehand using this stock of words.

For this speaker-independent speech recognition, speech samples of the stock of words of many different people have been collected in a database, the people forming a representative cross section of the user group of the speech recognition system. In order to ensure that a representative cross section is provided, the selection of people takes into consideration different dialects, age groups and genders. With the aid of a so-called "cluster method", e.g. an iterative algorithm, similar speech samples are combined in groups or so-called clusters. A phoneme, a phoneme cluster, or possibly even a whole word is assigned to the groups or clusters in each case. Within each group or cluster therefore, a plurality of typical representations of the phoneme, of the phoneme cluster, or of a whole word therefore exist in the form of corresponding model vectors. In this way, the speech characteristics of many different people are captured using few representations.

However convenient this factory-predetermined vocabulary of command words and possibly also names may be for the user, it does not however replace a user-specific adaptation, e.g. the insertion of new commands. This applies particularly in the case applies of name selection, i.e. a special speech control, wherein specific numbers are dialed when the name is spoken. Therefore devices of greater complexity offer a speaker-dependent speech control in addition to a speaker-independent speech control.

A speaker-dependent speech recognition system is optimized in relation to the speaker concerned, since it must be trained in the voice of the user before its first use. This is known as "say-in" or training. It is used to create a feature vector sequence from at least one feature vector.

Such a system, in which speaker-dependent and speaker-independent speech recognition are used in combination, can be seen in operation, i.e. during the speech recognition, in FIG. 1. In the context of feature extraction FE, a speech signal SS is temporally divided into time frames or frames F (framing) and subjected to preprocessing PP. One time frame can coincide with one sound or include a plurality of sounds. Likewise, a plurality of time frames may be required in order to form a sound. It is subjected to a Fourier transformation as part of the preprocessing PP.

The result of this transformation and of further preprocessing is a feature vector F_IS, which is subjected to a dimensional reduction by a linear discriminant analysis LDA-L, thereby producing a dimensionally reduced feature vector F_S. Since the dimensional reduction LDA-L is language-specific, the dimensionally reduced feature vector is likewise language-specific. Taking this dimensionally reduced feature vector F_S as a starting point, a speaker-independent speech recognition HMM-SI is carried out with reference to a monolingual language resource HMM-L. Alternatively, a speaker-dependent speech recognition SD is carried out on the basis of the feature vector F_IS.

For the speaker-independent speech recognition HMM-SI, the distances D are calculated between the relevant dimensionally reduced feature vector F_S and the model vectors which are present in the language resource HMM-L. During operation, this distance calculation provides a basis for determining an assignment to a model vector, or an assignment of a feature vector sequence to a model vector sequence. The information about the permitted model vector sequences is held in the speaker-independent vocabulary VOC-SI-L which was created by the factory or manufacturer. In the case of a search S using a trellis algorithm, for example, the suitable assignment or sequence of model vectors is determined on the basis of the distance calculation with reference to the vocabulary VOC-SI-L. A command word which is assigned to the model vectors is produced as a result R of the search S.

The speaker-dependent speech recognition SD which is also provided can take place on the basis of "dynamic time warping" DTW or neural networks, for example, i.e. correlation-based methods or sample-comparison methods, or other methods known to a person skilled in the art.

In this case, it is disadvantageous that speaker-dependent and speaker-independent speech recognition cannot be mixed in the system shown in FIG. 1, i.e. it must be known in advance of the speech recognition whether speaker-dependent or speaker-independent speech recognition is taking place.

In order to allow the mixing, the creation of an additional speaker-dependent vocabulary VOC-SD-L1 has been proposed in the case of speaker-independent speech recognition HMM-SI. This is shown in FIG. 2 in the context of the training or say-in in such a system. Blocks which are already present in FIG. 1 have the same reference characters in FIG. 2.

In this case, on the basis of the dimensionally reduced feature vector F_S, a distance calculation D is performed in relation to model vectors which are present in a language resource HMM-L1. This distance is converted D2I to an index or assignment information. This assignment information also represents the—in this case—speaker-dependent vocabulary VOC-SD-L1.

The system which was shown in training in FIG. 2 is now shown in operation, i.e. during speech recognition, in FIG. 3. Identical blocks are given the same reference characters again in this context.

Since this speaker-dependent vocabulary is also created on the basis of the language resource HMM-L1, i.e. by distance calculation D relative to the model vectors contained therein, speaker-dependent vocabulary VOC-SD-L1 and speaker-independent vocabulary VOC-SI-L1 can be mixed in the language L1 in the case of the system shown in FIG. 3, thereby eliminating the mixing problem which occurred in the case of the system in FIG. 1.

This has the disadvantage that, as a result of using the language resource HMM-L1 for creating the vocabulary, the system is now language-dependent, since the language resource HMM-L1 represents a specific language or language environment in relation to which the assignment information is stored.

SUMMARY OF THE INVENTION

Taking this related art as a point of departure, the invention addresses the problem of producing an alternative to this method, thereby eliminating the disadvantages of the existing systems. In particular, the invention addresses the problem of specifying a method for speech recognition and a communication device including a speech recognition entity, wherein speaker-dependent and speaker-independent speech control can be used in combination in a user-friendly manner.

A speech signal, e.g. a word or a sentence, consists of at least one acoustic unit. Acoustic unit can be understood to refer to one or more syllables, phonemes, a group of phonemes, word segments or even a word in the case of a sentence. This speech signal is first broken down into time segments.

The speech signal in each time segment can be described by a feature vector.

Since units having meaning, i.e. e.g. control instructions or command words, are generally only produced by the stringing together of a plurality of speech frames, a feature vector sequence is formed first. In this context, it is also possible for solely one feature vector to occur in the sequence. In general, the number of feature vectors in the feature vector sequence can be dependent on the length of e.g. the control instruction or even the time segments or time frames.

The feature vector sequence is now assigned to a model vector sequence. Language units having meaning are modeled for speech recognition as described at the beginning, for example. A set of model vectors is contained in a language resource, which is therefore e.g. the representation of a specific language for the purposes of speech recognition using the model vectors. Likewise, a language resource can also be the representation or the "operating mode" of a specific language in a defined environment, e.g. in a motor vehicle. The environment defines the environmental loudness level, for example.

For the purpose of speech recognition in a specific language resource, the assignment or assignment information of a feature vector sequence to a model vector sequence is stored, the feature vector sequence having been generated by a say-in or training. The storage takes place in a so-called vocabulary, for example.

The speech recognition takes place using a language resource, by the model vector sequence. In addition to a set of model vectors, a language resource also contains at least transition probabilities between two model vectors.

The core of the invention is now additionally to store the feature vector sequence itself, and not merely the assignment of this feature vector sequence to a sequence of model vectors.

This has the advantage that when changing over the language resource, i.e. when changing over to another language for example, it is not necessary to re-record the speech signal from which the feature vector sequence was formed. This is also possible if speaker-dependent and speaker-independent systems are used in parallel.

In order to reduce the required storage space, the feature vector sequence can be reduced in terms of its dimensions when it is assigned to a model vector sequence. This reduction can be performed by a linear discriminant analysis, for example. Performing a reduction has the advantage that the model vectors themselves can be stored in the reduced dimension and therefore less storage space is required for a language resource. It is important that the dimensional reduction of the feature vector or feature vector sequence only takes place in the context of the assignment, and that a non-reduced representation of the feature vector or feature vector sequence is retained.

In this way, a model vector sequence in a different language resource can preferably be assigned immediately when the language resource of the feature vector sequence is changed over.

In particular, the underlying language resource can be created using a so-called Hidden Markov Model (HMM), in which transition probabilities to the next unit when forming a word, for example, are taken as a basis for each acoustic unit, e.g. a phoneme. An HMM has the advantage that it can readily be utilized in the case of speaker-independent speech recognition, and therefore it is possible to preset an extensive vocabulary, which does not have to be trained by the user personally, in addition to speaker-dependent instructions.

Particular advantages are also produced when such a speaker-dependent speech recognition is combined with a speaker-independent speech recognition. An assignment between feature vector sequence and model vector sequence can take place on the basis of a sequence of stored speaker-dependent and speaker-independent feature vectors. This assignment can exist alongside other assignments, which have already been preset for the user in the context of the speaker-independent speech recognition, for example. This means that the speech recognition now refers to a shared set of assignments or a shared "vocabulary", and therefore no changing between various speech recognitions takes place.

In particular, this has the advantage that it is not necessary to know in advance, e.g. because a speech recognition that will start is dependent on this knowledge, whether speaker-independent or speaker-dependent speech commands are involved.

A suitable communication device includes at least a microphone by which the speech signal is captured, a processor unit by which the speech signal is processed, e.g. the breaking down into time frames or the extraction of the feature vector for a time frame. Provision is also made for a storage unit for storing the processed speech signal and at least one language resource. Microphone, storage unit and speech recognition entity work together for the speech recognition itself.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
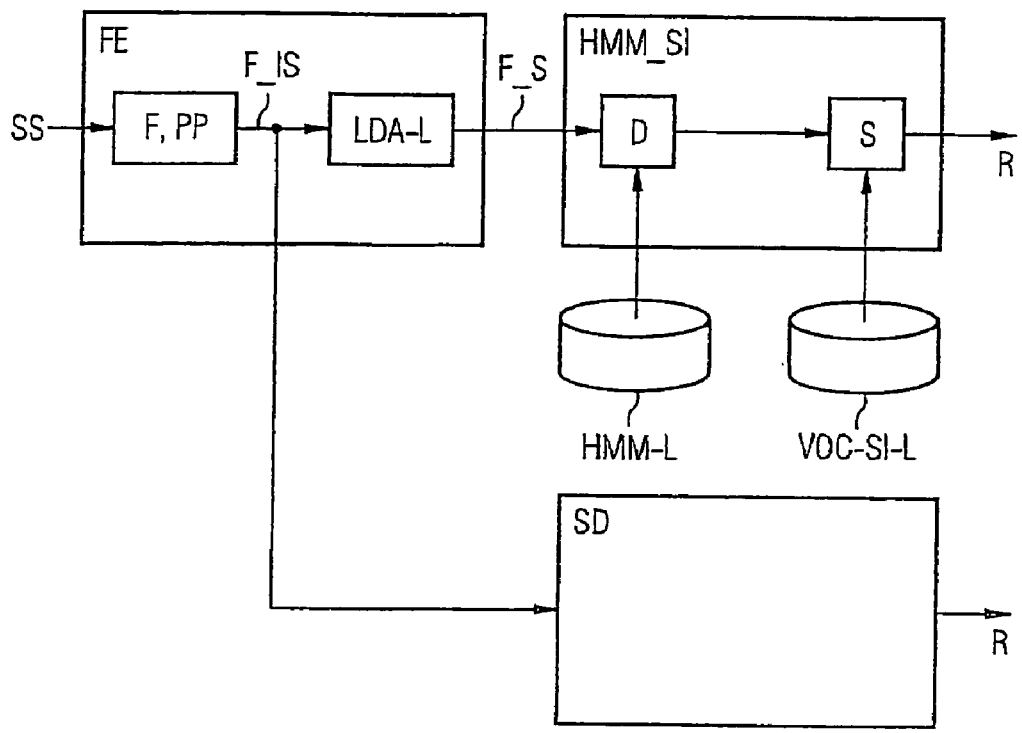
FIG. 1 is a block diagram showing the execution of a combined speaker-dependent and speaker-independent speech recognition as per the related art, in which the speaker-dependent and speaker-independent speech recognition cannot be mixed.

Reference will now be made in detail to the preferred embodiments of the present invention, examples of which are illustrated in the accompanying drawings, wherein like reference numerals refer to like elements throughout.

For better understanding, some fundamental terms should be explained first. Each language can be divided into phonemes which are specific for the language concerned. Phonemes are sound modules or sounds which offer distinction of meaning. A vowel is an example of such a phoneme. However, a phoneme can also be made up of a plurality of letters and correspond to a single sound, e.g. "sch" or "ch". Due to the difference between orthography and pronunciation, it is not automatically possible to equate letters and phonemes. In German, for example, the letter "a" can be pronounced long as in the word "Hase" or short as in the word "Hass". Although the same letter is used in this case, the phonemes are different. Due to the different pronunciations, it is not automatically possible to equate a phoneme in one language with a phoneme in another language.

The fundamental execution of a speech recognition is now explained on the basis of a phoneme-based speech recognition. As mentioned above, there are also speech recognitions which are based not on phonemes but on words or segments of words, for example.

In the case of phoneme-based speech recognition, for the purpose of analyzing the incoming data stream, the speech signal is divided into short time windows having a length of e.g. 10 or 20 milliseconds. Subsequently, only those elements which are necessary for an interpretation of what has been spoken are computed or extracted. The speech recognition therefore filters out e.g. information about the pitch of the speaker, the gender, the speaking speed, the fluctuations in voice and background noises, etc. This mainly serves to reduce the volume of data that accumulates during the speech recognition. This is necessary because the volume of data that accumulates during the speech recognition is so great that it cannot normally be processed in real time, particularly not by a compact processing unit such as those found in communication devices.

A Fourier transform is generated from the speech signal or acoustic signal which has been extracted thus far, wherein the speech signal is broken down according to frequency. By linking the Fourier transforms with at least one of feasibly several possible window functions, the function only having non-zero values in a limited time window, an increase in the contrast and/or a decrease of the noise component of the speech signal is achieved. As a result, a series of feature vectors or transcriptors is obtained, representing the profile of the speech signal relative to time.

The individual feature vectors can be assigned to various classes of feature vectors. The classes of feature vectors comprise groups of similar feature vectors in each case. As a result of assigning the feature vectors to the individual classes of feature vectors, the speech signal is identified i.e. it is present in a phonetic transcription. The phonetic transcription can be assigned a semantic content if the classes of feature vectors have been assigned information indicating which sound is represented by the relevant class of feature vectors.

The classes of feature vectors alone do not yet provide unambiguous information concerning which sound has just been spoken. In order for the classes of feature vectors to represent such sound information, it is necessary to have speech recordings from which individual sounds or phonemes, phoneme clusters or whole words can be assigned to the classes of feature vectors. A phoneme cluster, which can also be designated as a phoneme segment, simultaneously combines a plurality of individual phonemes into a unit. The volume of data which has to be processed during the speech recognition can also be reduced as a result.

The previous steps during the speech recognition served primarily to reduce and prepare the data. Now the conversion into semantic content or text takes place. As part of this activity, a recognition routine generates the most probable word strings. As a computing basis for this probability, most speech recognizers today use a language resource which is created using a so-called "Hidden Markov Model" or HMM. This model is intended to overcome the difficulty that individual speakers use varying durations when pronouncing words or individual syllables, or even connect them together. Such a time delay cannot be exactly described by a function and therefore this model, which recognizes words despite their multiple possible pronunciations, is used here. Simply stated, transition probabilities between individual phonemes are computed using a so-called "forwards-backwards algorithm". The most probable status, i.e. the most probable string of phonemes, is then determined.

A language resource, i.e. a set of model vectors with which a specific language can be represented, is created at the factory or by the manufacturer. Transition probabilities between individual model vectors are also specified in a language resource, so that e.g. words in a language can be formed.

The speech recognition which has just been described in general will now be explained in greater detail with reference to figures. For this purpose, reference is now made to FIG. 4, which schematically represents a "say-in" or training as per a configuration of the invention. Identical blocks are given the same reference characters as in the FIGS. 1, 2 and 3.

A speech signal SS first undergoes feature extraction FE. In general, this feature extraction initially includes a division into time frames or frames F (framing), followed by a preprocessing PP of the speech signal SS which has been divided into frames. This generally includes a Fourier transformation. Optionally, an interference noise suppression or channel optimization also takes place. In this context, channel is understood to mean the path from the microphone to the AD converter, and interference noises are compensated. The channel can vary due to different microphones, e.g. in the car kit or in the mobile radio terminal itself. The channel will also exhibit different properties in different rooms, since the impulse response to an acoustic effect is different.

Figure 7:
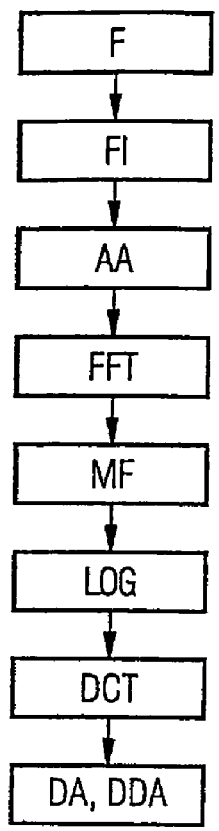
FIG. 7 is a flowchart showing the execution of individual steps in the context of the temporal division and preprocessing of the speech signal.

For example, the steps could be executed as follows during the feature extraction FE for determining a feature vector as illustrated in FIG. 7.

After the signal has been divided F into time frames, the preprocessing PP takes place. This can include the following steps: filtering FI of the signal using a "finite impulse response filter" (FIR), forming AA so-called "hamming windows" in order to achieve anti-aliasing, i.e. avoiding the use of frequencies which have not actually been determined. Next, a "fast" Fourier transformation FFT is carried out. The result is a "power spectrum", in which the power is plotted in relation to the frequency. This power spectrum is subjected to a so-called "Mel" filtering MF with 15 triangular filters for adapting to the sensitivity of the human ear. The result of this is 15 coefficients which are e.g. logarithmized in order to reduce the dynamic range. A discrete cosine transformation DCT is used to determine 12 so-called "Cepstrum" coefficients, so that there are now 13 coefficients including the logarithmized energy. A vector which is determined in this manner is also called an MFCC vector or "Mel filter Cepstrum coefficient vector". In order to reduce the error susceptibility of these coefficients, a so-called delta analysis DA and delta-delta analysis DDA are carried out, in which connections to the preceding and to the pre-preceding frame are determined. The connections are likewise determined with 13 coefficients each, and therefore 39 coefficients are present after this string of transformations has been executed. These 39 coefficients represent the entries or components of a feature vector. The routine which is described here is a selected example. Various possibilities for feature extraction are known to a person skilled in the art, and therefore further details are not provided here.

Reference is now made to FIG. 4 again. The result of this process is a language-independent feature vector F_IS. Sequences of at least one language-independent feature vector F_IS are stored in a collection or database FV-SD(F-IS) of speaker-dependent language-independent feature vectors F_IS.

At the same time, the language-independent feature vector F_IS for speaker-dependent and language-dependent vocabulary is processed. In order to reduce storage space during the so-called linear discriminant analysis LDA-L1, which is specific to a language resource (L1), a matrix multiplication is applied using an LDA matrix which was already created at the factory.

As from this time point, there exists a language-dependent feature vector F_S. In comparison with the language-independent feature vector F_IS, the language-dependent feature vector includes less information content due to the data reduction during the dimensional reduction, which is not loss-free. Therefore it is not possible to recreate the language-independent feature vector F_IS from the language-dependent feature vector F_S.

The multiplication using an LDA matrix primarily performs a diagonalization, wherein the dimension of the feature vector can be reduced by the selection of a suitable individual system of base vectors. This LDA matrix is language-specific, since the respective vectors also vary due to the variability of different languages or language modes or language environments. It is already determined at the factory. The way in which this matrix is determined by averaging and corresponding weighting, e.g. on the basis of so-called sub-phonemes and other subgroups e.g. "d-phones", is known to a person skilled in the art and is not explained in further detail here.

In the context of the LDA multiplication, for example, two (consecutive) 39-dimensional MFCC vectors are combined to form a 78-dimensional super-vector, which is multiplied using the 78×24 LDA matrix. The result is a 24-dimensional so-called post-LDA feature vector. The post-LDA feature vector is language-dependent, since the LDA matrix is language-dependent. Language resource is understood in particular to mean a set of model vectors, by which a language can be represented. Furthermore, the language resource can also represent a language in a specific environment. This applies e.g. when using communication devices in a vehicle where, due to the hands-free operation, there is a noise level which is different to that which is present in the case of normal calls.

Reference is now made to FIG. 4 again, in which these feature vectors are initially assigned to existing groups of model vectors in the context of a speaker-independent HMM modeling HMM-SI. This assignment takes place by a distance calculation D relative to model vectors, which can correspond e.g. to some extent to a determining of the most similar model vector, wherein the model vectors are present in a monolingual HMM language resource HMM-L. The assignment information between feature vector and model vector, or feature vector sequences and model vector sequences, is stored in a so-called vocabulary. The speaker-dependent vocabulary VOC-SD-L1 for the language resource L1 is created by distance calculation D relative to model vectors from the language resource HMM-L1 and conversion D21 of the distance into assignment or index information.

Figure 2:
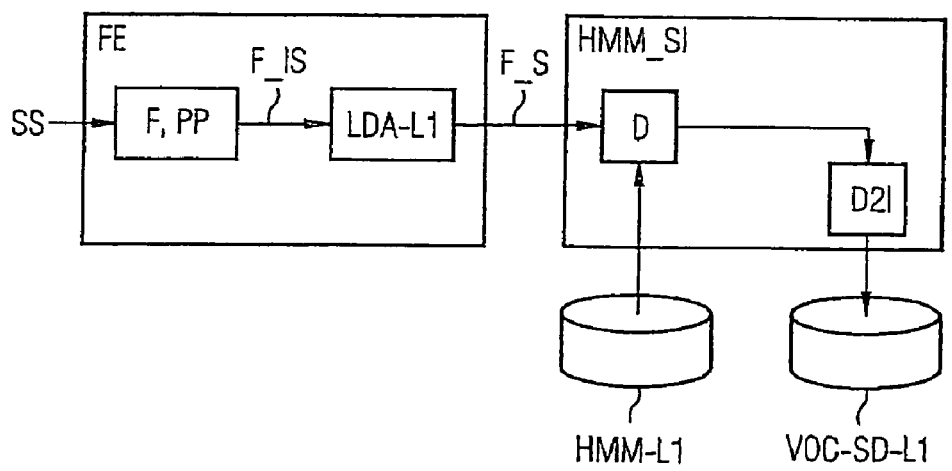
FIG. 2 is a block diagram showing the execution of a training or "say-in" in the case of a system having a language resource HMM-L1 as per the related art. The generated vocabulary VOC-SD-L1 is speaker-dependent and language-dependent, and can be used in a combination of speaker-dependent and speaker-independent speech recognition (not shown)
Figure 3:
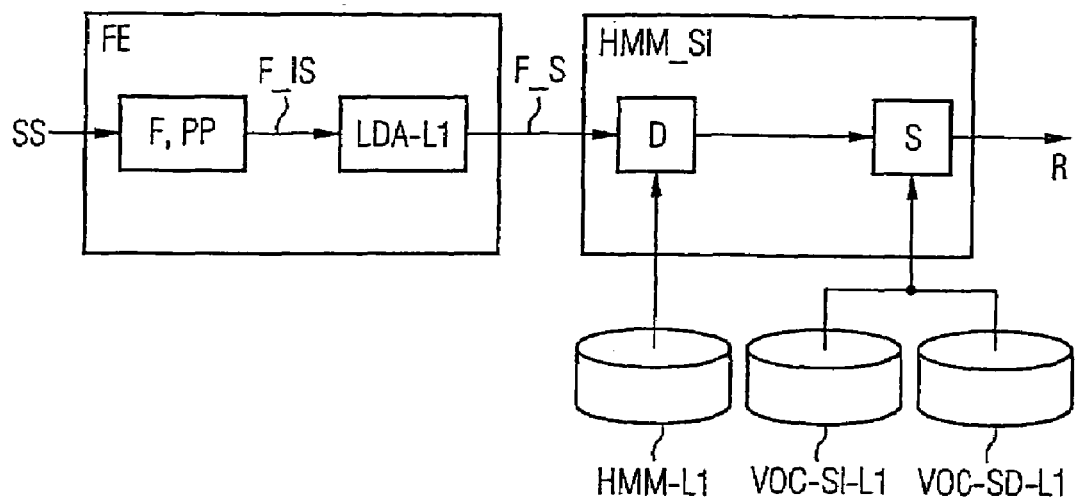
FIG. 3 is a block diagram of the system as per FIG. 2 during operation, i.e. when being used for speech recognition, wherein a combination of speaker-dependent and speaker-independent speech recognition is implemented in which both techniques can be mixed but which is language-dependent.

Therefore, unlike the related art as shown in FIGS. 2 and 3, the language-independent feature vector or sequence of feature vectors, by which a control instruction is described, is also stored. This has the fundamental advantage that the say-in does not have to be repeated when switching the language resource.

Figure 5:
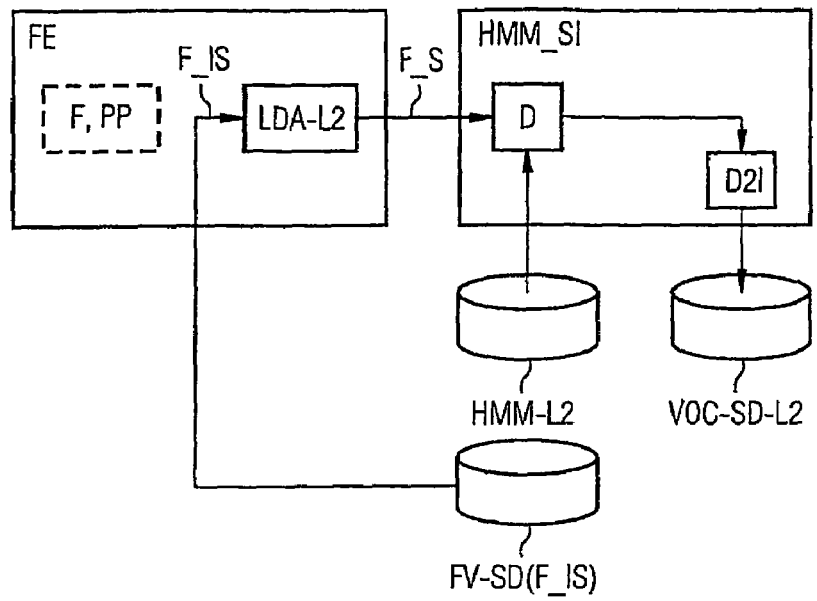
FIG. 5 is a block diagram showing the execution of a transcoding which is effected without interaction from the user when changing over the language resource of a user-specific vocabulary, which was created as per FIG. 4, from a first language resource L1 into a second language resource L2 in accordance with an embodiment of the invention.

Reference is now made to FIG. 5. When switching to a different language resource HMM-L2, the language-dependent dimensional reduction LDA-L2 can take place on the basis of this language-independent vector F_IS.

For example, if the user switches from the language L1 to a language L2 via a user interface in order to use or when using the car kit for a communication device, switching from quiet language environment L1 to a noisy language environment L2 takes place automatically. Therefore L1 or L2 designates a language or a language environment.

Figure 4:
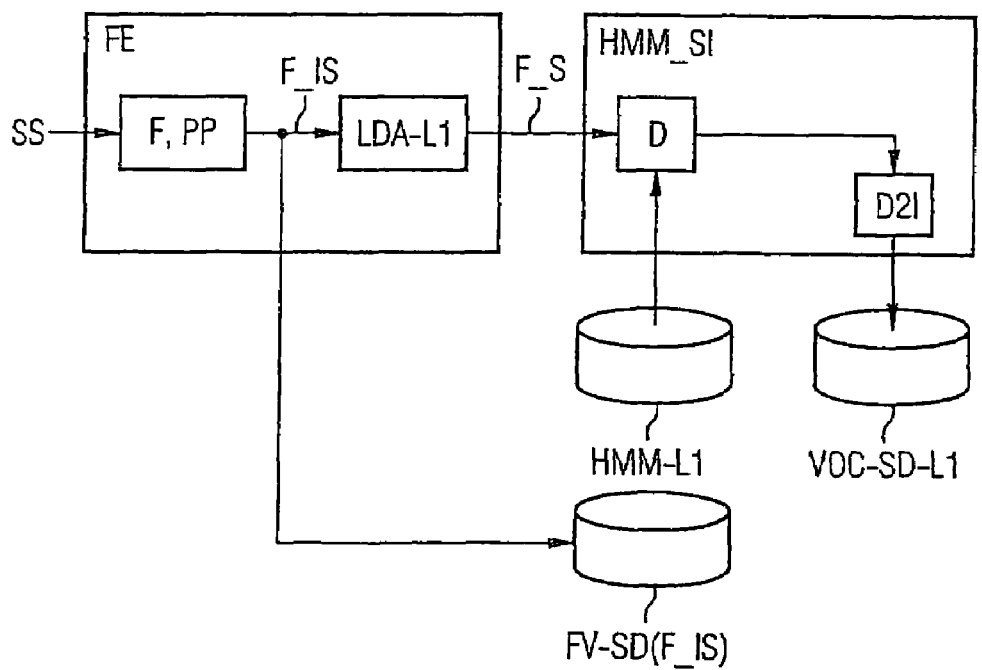
FIG. 4 is a block diagram showing the execution of a training or "say-in" in the case of a system according to an embodiment of the invention.

The so-called transcoding TC then takes place, which is the assignment of a language-dependent feature vector F_S to a model vector from a language resource, or the assignment of a sequence of language-dependent feature vectors F_S to a sequence of model vectors. The transcoding of command words, whose training is shown in FIG. 4, is now illustrated in FIG. 5. Using the language resource HMM-L2 which was already created at the factory, the transcoding TC takes place offline, i.e. without interaction with the user, on the basis of the language-independent feature vectors F_IS which are stored in the database FV-SD(F_IS). Consequently, is it possible without active participation from the user to create an assignment and therefore a control instruction for each language for which a language resource HMM-L2 has been created, e.g. at the factory or by the manufacturer.

In FIG. 5 the temporal division F into frames and the preprocessing PP are marked using a broken line because, unlike the training, no speech signal is used during transcoding and therefore this unit is not required, reference being made instead to the language-independent feature vectors F_IS which were created and stored during the training.

In summary, the result of the transcoding is a speaker-dependent vocabulary VOC-SD-L2, which was created on the basis of the language resource HMM-L2 using the language-independent stored feature vectors. The speaker-dependent vocabulary contains assignments between sequences of feature vectors and model vectors.

Figure 6:
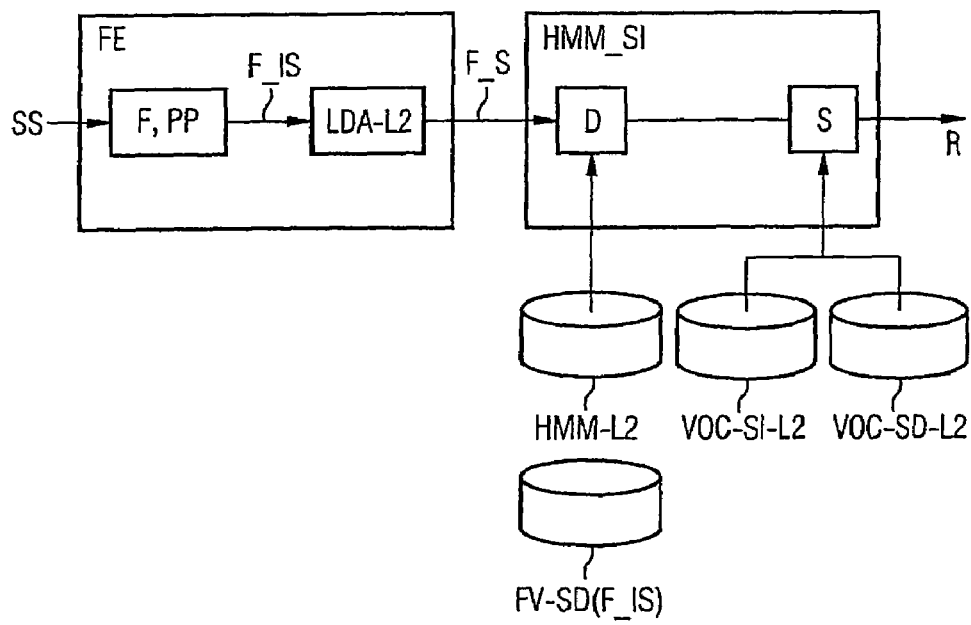
FIG. 6 is a block diagram of the embodiment as per FIG. 4 and FIG. 5 in operation.

Reference is now made to FIG. 6. The speech recognition system which was shown in FIG. 4 in the context of training and in FIG. 5 in the context of transcoding is now shown in FIG. 6 in the context of operation. Identical notions are again given identical designations.

For example, the language or language environment L2 is selected in which the transcoding took place in FIG. 5. The dimensional reduction LDA-L2 therefore takes place depending on the language or language environment L2.

The distance calculation D takes place using the language resource HMM-L2 for the language or language environment L2. The search S now takes place on the basis of the speaker-independent vocabulary VOC-SI-L2, which corresponds to the speaker-independent vocabulary VOC-SI-L1 from FIG. 3 for the language environment L2, and the speaker-dependent vocabulary VOC-SD-L2. It is therefore possible to use the—factory-produced—vocabulary VOC-SI-L2 and the speaker-dependent vocabulary VOC-SD-L2 simultaneously, i.e. without having to select between speaker-dependent and speaker-independent speech recognition.

In other words, this has the advantage that speaker-dependent and speaker-independent vocabularies coexist in such a way that it is not necessary for a speech recognition to know whether a speaker-dependent or speaker-independent command is forthcoming, thereby significantly increasing the flexibility of e.g. combined commands. Knowledge of whether a speaker-dependent or speaker-independent command is forthcoming would be necessary if, for example, the speaker-dependent speech recognition was executed using feature vectors and the speaker-independent speech recognition was executed on the basis of assignment information.

Figure 8:
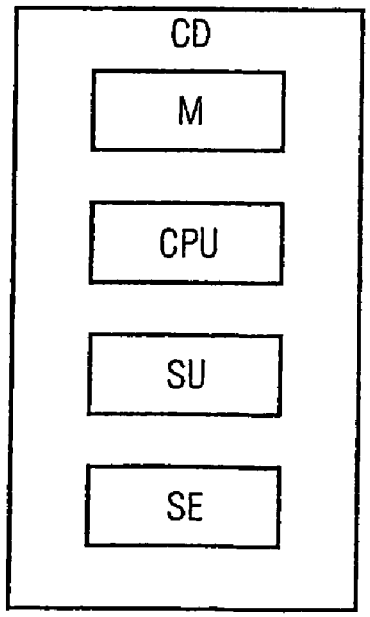
FIG. 8 is a block diagram of a communication device for carrying out a speech recognition method.

Finally, FIG. 8 shows a communication device which is suitable for carrying out the described speech recognition. The communication device CD includes at least a microphone M with which the speech signal is captured, a processor unit CPU with which the speech signal is processed, e.g. the breaking down into time frames or the extraction of the feature vector for a time frame. Provision is further made for a storage unit SU for storing the processed speech signal and at least one language resource. Microphone, storage unit and speech recognition entity SE interwork for the purpose of speech recognition.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C.

The invention claimed is:

1. A method for speaker-dependent speech recognition, comprising:
    capturing a speech signal, including a speech command, of a speaker;
    breaking down the speech signal into time frames;
    characterizing the speech signal in each captured time frame by forming a corresponding feature vector;
    forming a language-independent feature vector sequence from at least one feature vector;
    storing the language-independent feature vector sequence;
    assigning the language-independent feature vector sequence to a language-dependent sequence of model vectors in a first language resource which includes a multiplicity of language-dependent model vectors;
    storing first assignment information which specifies assignment of the language-independent feature vector sequence to the language-dependent sequence of model vectors;
    recognizing the speech command which is assigned to the language-dependent sequence of model vectors;
    selecting a second language resource different from the first language resource;
    assigning the language-independent feature vector sequence previously stored to a language-dependent model vector sequence in the second language resource; and
    storing second assignment information regarding said assigning of the language-independent feature vector sequence to the language-dependent model vector sequence in the second language resource.

2. A method as claimed in claim 1, wherein the speech signal is made up of acoustic units.

3. A method as claimed in claim 2, wherein each of the first and second language resources is based on a Hidden Markov Modeling of acoustic units of a speech signal.

4. A method as claimed in claim 3, wherein an acoustic unit is formed by a word or a phoneme.

5. A method as claimed in claim 3, wherein an acoustic unit is formed by word segments or groups of related phonemes.

6. A method as claimed in claim 5, wherein different language resources are assigned to at least one of different languages and different language environments.

7. A method as claimed in claim 6, wherein different language environments indicate different environmental noise situations.

8. A method as claimed in claim 7, further comprising reducing dimensionality of the feature vector or the language-independent feature vector sequence by a matrix multiplication before assigning to the model vector or the model vector sequence.

9. A method as claimed in claim 8, further comprising specifying the matrix for dimensional reduction from one of a Linear Discriminant Analysis, a Principal Component Analysis and an Independent Component Analysis.

10. A method as claimed in claim 9, wherein the speaker-independent speech recognition is language-dependent.

11. A communication device, comprising:
    a microphone recording a speech signal, including a speech command, of a speaker;
    a processor processing the speech signal by breaking down the speech signal into time frames, characterizing the speech signal in each captured time frame by forming a corresponding feature vector and forming a language-independent feature vector sequence from at least one feature vector;

a storage unit storing the language-independent feature vector sequence obtained from the speech signal; and a speech recognition entity, coupled to the microphone, configured for at least speaker-dependent speech recognition by assigning the language-independent feature vector sequence to a language-dependent sequence of model vectors in a first language resource which includes a multiplicity of language-dependent model vectors, storing first assignment information which specifies assignment of the language-independent feature vector sequence to the language-dependent sequence of model vectors, recognizing the speech command which is assigned to the language-dependent sequence of model vectors, selecting a second language resource different from the first language resource, assigning the language-independent feature vector sequence previously stored to a language-dependent model vector sequence in the second language resource, and storing second assignment information corresponding thereto.

12. A communication device as claimed in claim 11, wherein said speech recognition entity simultaneously uses speaker-dependent and speaker-independent vocabularies.

* * * * *